(12) United States Patent
D'Ippolito et al.

(10) Patent No.: US 7,107,496 B1
(45) Date of Patent: Sep. 12, 2006

(54) METHOD, APPARATUS, COMPUTER-READABLE MEDIA AND USER INTERFACE FOR ANNUNCIATING PROBLEMS IN A SYSTEM

(75) Inventors: Tommaso D'Ippolito, Ottawa (CA); Blair Edward Paul Moxon, Kanata (CA); Johnnie Irving Johnson, Kinburn (CA); Joseph Eytan Benedek, Nepean (CA); Douglas Edward Talbott, Kanata (CA); Joseph John Di Vittorio, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 529 days.

(21) Appl. No.: 09/624,239

(22) Filed: Jul. 24, 2000

(51) Int. Cl.
*G06F 11/00* (2006.01)

(52) U.S. Cl. .......................... 714/46; 714/43

(58) Field of Classification Search .................. 714/46, 714/43, 48, 57; 370/395.21
See application file for complete search history.

(56) References Cited

U.S. PATENT DOCUMENTS

| | | | |
|---|---|---|---|
| 5,491,631 A * | 2/1996 | Shirane et al. ................ 701/35 |
| 5,740,354 A * | 4/1998 | Ben-Natan et al. ........... 714/45 |
| 5,963,911 A * | 10/1999 | Walker et al. ................ 705/7 |
| 6,012,152 A * | 1/2000 | Douik et al. .................. 714/26 |
| 6,018,567 A * | 1/2000 | Dulman .................... 379/32.03 |
| 6,021,262 A * | 2/2000 | Cote et al. .................... 714/48 |
| 6,104,988 A * | 8/2000 | Klarer ........................ 702/183 |
| 6,154,778 A * | 11/2000 | Koistinen et al. ........... 709/228 |
| 6,253,243 B1 * | 6/2001 | Spencer ...................... 709/224 |
| 6,269,401 B1 * | 7/2001 | Fletcher et al. ............. 709/224 |
| 6,516,424 B1 * | 2/2003 | Satomi et al. ................. 714/4 |
| 6,556,659 B1 * | 4/2003 | Bowman-Amuah ........ 379/9.04 |
| 6,570,855 B1 * | 5/2003 | Kung et al. ................. 370/237 |
| 6,584,502 B1 * | 6/2003 | Natarajan et al. ........... 709/224 |
| 6,611,867 B1 * | 8/2003 | Bowman-Amuah ......... 709/224 |
| 2002/0016871 A1 * | 2/2002 | Graf .............................. 710/5 |

* cited by examiner

*Primary Examiner*—Bryce P. Bonzo
(74) *Attorney, Agent, or Firm*—Jeffrey M. Measures; Borden Ladner Gervais LLP

(57) ABSTRACT

A method, apparatus, computer-readable media and user interface for annunciating problems in a system. The method involves producing signals for concurrently indicating a plurality of system problems and problem priority information associated with the system problems based on data representing system conditions. Such signals may be used to drive a display device. Operator input signals may be received to permit selection of a particular problem for which details are provided. The indication of priority information assists a system manager or operator to quickly prioritize system problems according to different perspectives provided by different priority information. Optionally, the operator can also view any of the detailed information related to the particular system problem, which may include alarm information, performance degradation information, service violation information, or penalties or lost income, for example.

44 Claims, 12 Drawing Sheets

DETAILS 216
| SERVICE VIOLATIONS | ALARMS | PERFORMANCE DEGRADATIONS 218 | | | | | |
|---|---|---|---|---|---|---|---|
| CUSTOMER | CUST. SERVICE | LEVEL | METRIC | DELIVERED | AGREED | PENALTY/IMPACT | |
| ACURA CANADA | FRAME RELAY | SILVER | SERVICE AVAIL. | 95.2% | > 98.5% | $300/s | |
| AIR CANADA | VPN | GOLD | MTBF | 2 DAYS | < 5 DAYS | $500/s | |
| GENERAL MOTORS | MEGAROUTE | GOLD | LATENCY | 168 msec | < 150 msec | $80/s | |
| JOE'S GARAGE | IP | BRONZE | DIAL PORT AVAIL | 93% | > 95% | $25/s | |
| MICROCELL SOLUT'N | AMPS TRUNK | GOLD+ | SERVICE AVAIL. | 96.3% | > 99.5% | $500/s | |
| MICROCELL SOLUT'N | AMPS TRUNK | GOLD+ | NETWORK AVAIL | 98% | > 99.9% | $750/s | |
| NATIONAL POST | FRAME RELAY | GOLD+ | PACKET LOSS | 1.75% | > 0.7% | $150/s | |
| SEARS CANADA | FRAME RELAY | GOLD | PACKET LOSS | 1.75% | < 1% | $50/s | |
| SYMPATICO | IP VPN | GOLD | MTBF | 2 DAYS | > 5 DAYS | $500/s | |

220

9  SLA(s) TOTAL AT LAST REFRESH: 02/02/00 14:35:22

| METRIC | AGREED | PENALTY | | METRIC | AGREED | PENALTY |
|---|---|---|---|---|---|---|
| (MTTR): | < 5 HOURS | $200/hr | | PORT AVAIL.: | > 95.0% | $25/sec |
| (MTBF): | > 3 DAYS | $500/sec | | LATENCY: | < 150msec | $80/sec |
| NETWORK AVAIL.: | 99.7% | $750/sec | | PACKET LOSS: | 99.7% | $50/sec |
| SERVICE AVAIL.: | 99.5% | $500/sec | | DISCARDS: | < 0.8% | $50/sec |

CONTACT INFORMATION:

MIKE BENDER
COMPANY NAME
732 STREET ST
OTTAWA, CANADA
K1K 2K2

PHONE: (613) - 442-7276
CELL: (613) - 367-8944
FAX: (613) - 236-6745
e-mail: mbender@company.com

224 — VIEW CONTRACT 210
222

FIG. 2B

NORTEL NETWORKS - PROBLEM MANAGER

PROBLEM LIST

| PROBLEM | VIOLAT' | ALARMS | DEGRAD' | COST | TIME |
|---|---|---|---|---|---|
| SONET: EXPERIENCING TRAFFIC LOSS, RECEIVE NOT PROTECTED | 9 | 8 | 10 | 4 | 1/3/00 14:39:48 |
| SONET: EXPERIENCING TRAFFIC LOSS, TRANSMIT NOT PROTECTED | 9 | 9 | 7 | 5 | 1/3/00 14:24:42 |
| FR: SUBSYSTEM FAILURE, CONNECTIONS ARE DOWN | 9 | 23 | 14 | 3 | 1/3/00 14:16:31 |
| ATM: LOGICAL PATH SIGNAL LOST | 8 | 22 | 14 | 5 | 1/3/00 14:13:36 |
| SONET: REMOTE LINE HAS FAILED | 4 | 8 | 6 | 5 | 1/3/00 14:11:34 |
| SWITCHING: TRUNK CONNECTIONS ARE DOWN | 9 | 11 | 24 | 4 | 1/3/00 14:15:09 |

CAUSE AND CORRECTION: TRANSMIT TRAFFIC IS NOT PROTECTED ON NE 294 OC3G1s. THE NEAR-END OPTICAL CARD DETECTED A PROBLEM ON ITS TRANSMITTED OPTICAL SIGNAL

DOCUMENT REFERENCE: 432-3653-821-ubal

FIG. 3A

DETAILS

| SERVICE VIOLATIONS | ALARMS | PERFORMANCE DEGRADATIONS | | | |
|---|---|---|---|---|---|
| NE NAME | TYPE | UNIT | REASON | SEVERITY | TIME |
| 1008 BoATM01 | COM | COMMUNI... | Rx AIS | CRITICAL SA | 1/3/00 14:50:07 |
| 1008 BoATM01 | COM | COMMUNI... | COMMSUBSYSTEM | MAJOR SA | 1/3/00 14:50:29 |
| 1008 BoATM01 | COM | CELL | LCD | CRITICAL SA | 1/3/00 14:50:04 |
| 1008 BoATM01 | COM | NEAR PATH | DEGRADED SIGNAL | MINOR NSA | 1/3/00 14:50:13 |
| 1011 CleoATM01 | COM | OPERATOR | OPERATION COND | CRITICAL SA | 1/3/00 14:52:24 |
| 1011 CleoATM01 | COM | OPERATOR | OPERATION COND | CRITICAL SA | 1/3/00 14:52:24 |
| 1011 CleoATM01 | COM | COMMUNI... | COMMSUBSYSTEM | MAJOR SA | 1/3/00 14:52:43 |
| 514 CleoATM01 | FAC | OC3 G4 | Rx AIS | WARNING NSA | 1/3/00 14:52:32 |
| 1008 BoATM01 | COM | CELL | LCD | MAJOR SA | 1/3/00 14:50:04 |

9 ALARM(S) TOTAL AT LAST REFRESH: 02/02/00 14:35:22    REFRESH NOW

↑ 212

ALARM TYPE: COMMUNICATIONS    ACKNOWLEDGED BY: LIQIANG    DISPLAY: BMERHFBB:0.0    REASON:

COMPONENT: Lp/2 SONET/0 PATH/0    HOSTNAME: BMERHFBB    LOSS OF FRAME. LOSS OF CELL DELINIATION HAS BEEN DETECTED. CHECK THE CABLING AND CONFIGURATION.

ALARM: CRITICAL    TIME: 1/3/00 8:43

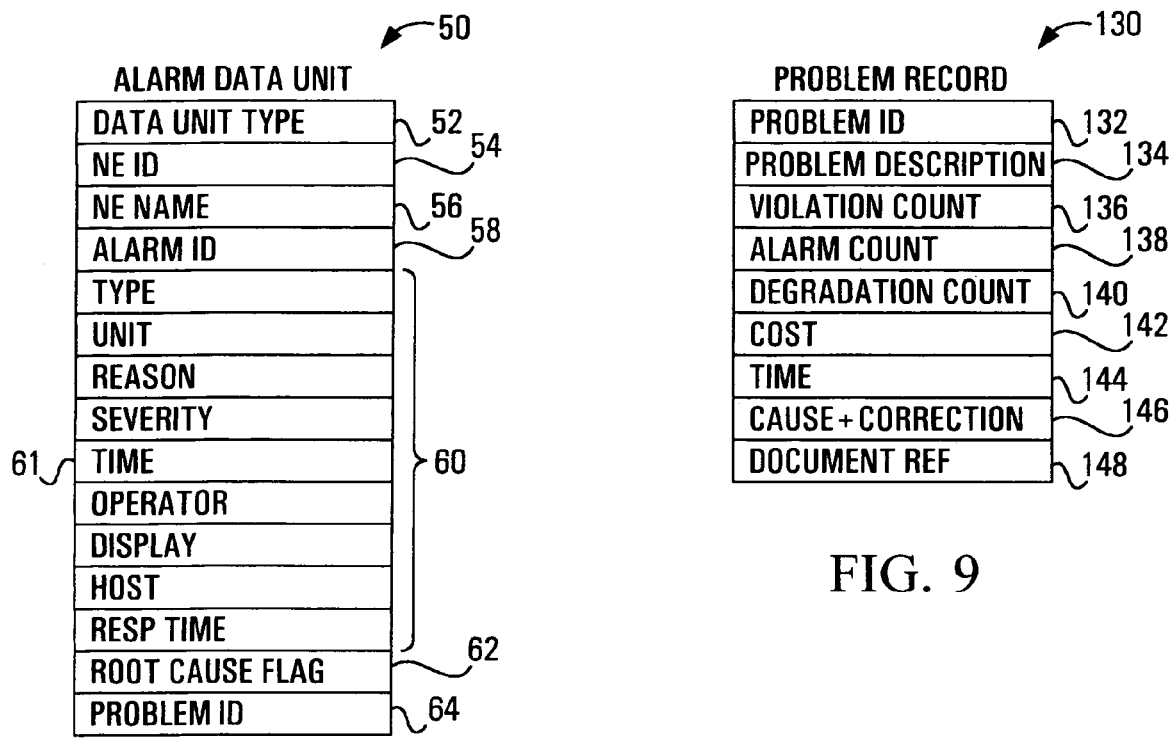
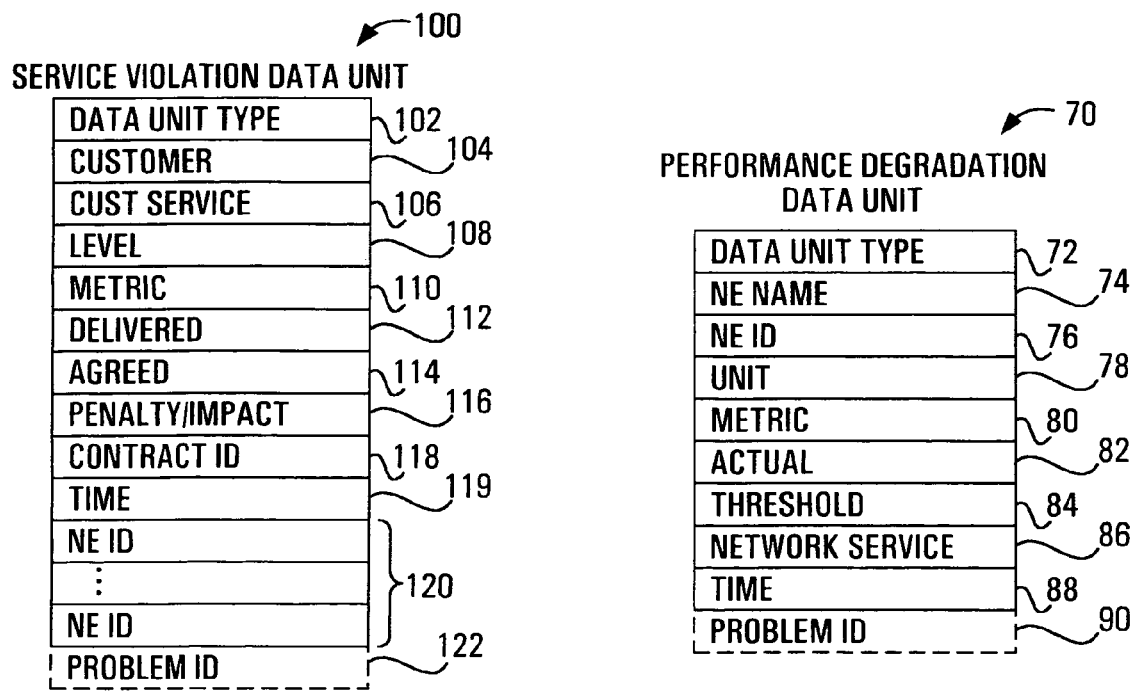

METHOD, APPARATUS, COMPUTER-READABLE MEDIA AND USER INTERFACE FOR ANNUNCIATING PROBLEMS IN A SYSTEM

BACKGROUND OF THE INVENTION

1. Field of Invention

This invention relates to the management of systems and more particularly to methods, apparatus, computer-readable media and a user interface for annunciating problems in a system.

2. Description of Related Art

Tools exist for the management of system problems, such as those encountered in telecommunications networks. These system management tools typically operate on a PC or UNIX workstation and enable the maintenance, surveillance and administration of multiple telecommunications network elements making up the system. Such tools provide for management of the network, that is, monitoring alarms, monitoring performance, managing connections and testing for faults.

An objective of existing system management tools is to provide a centralized view of a system so as to enable the operator to identify system problems from multiple events or conditions, such as alarms and performance degradations. For example, an initial root cause, such as an alarm, can often cause a cascade or flood of subsequent events through the system. Many events, such as alarms and performance degradations, can therefore be symptomatic of a single system problem. When there are many such events, it becomes difficult to determine which ones are correlated to a root cause system problem.

Some existing system management tools provide a GUI (graphical user interface) to assist the operator. One example is HP Open View Network Node Manager, provided by Hewlett-Packard Corporation of California, U.S.A. Such tools commonly represent a number of telecommunications network elements on a display in a topological configuration, but the display may be cluttered with iconic representations of a state for each network element. While such a display helps the operator to locate individual alarms or performance degradations in a system, it may not help the operator identify the relationships among these events and system problems, or root causes of problems.

Root-cause analysis tools have been developed for telecommunications networks and may correlate alarm events into problem sets, each set consisting of a direct detected alarm event and a correlated set of symptomatic alarm events. This automated correlation greatly reduces the amount of time the operator would have to spend in manually filtering the alarm events. Furthermore, such tools direct the operator's attention from dealing with individual events to dealing with overall problem sets. Some tools are capable of providing a brief probable cause description of the problem set and of providing a reference that can be used to help correct the problem set.

Most root-cause analysis tools are limited to use with certain types of alarm events. From a flood of different types of alarm events, they select one type of alarm and perform an exhaustive search for alarms of that type only. This allows many different types of alarm events to be treated as symptomatic of a single system problem.

Other tools allow an operator to examine service violations associated with an event. Often, an operator is responsible for maintaining intended service levels across the telecommunications network. These intended service levels could relate to agreements with customers, for example. There may also be penalties or costs associated with failure of the system to comply with the intended service levels described by clauses in a service level agreement (SLA), for example. Compliance of a particular telecommunications network element with a plurality of intended service levels may be crucial. Tools which provide this type of information allow the operator to examine intended service levels and observe service violations associated with a particular event or a particular telecommunications network element.

Generally existing system management tools help the operator to diagnose system problems and synthesize a great deal of information through a centralized view of the system, such as the telecommunications network described above. However, they leave a large amount of information to be synthesized by the operator, unaided. The operator may have to examine details of performance degradations to determine the system problems to which they relate. The operator may have to separately examine details of service violations to determine the system problems to which they relate, and to determine the relative importance of the system problems. The operator may use these determinations to prioritize the system problems and to schedule and plan maintenance and repair of the system. However, little is done by existing tools to summarize such details into problem priority information that could assist the operator in quickly identifying and prioritizing system problems. Consequently, there is a need for system management tools which provide a better description of system problems to permit an operator to better identify and prioritize system problems.

SUMMARY OF THE INVENTION

The present invention addresses the above need by providing, in accordance with one aspect of the invention, a method and apparatus for annunciating problems in a system. The method involves producing signals for concurrently indicating a plurality of system problems and problem priority information associated with the system problems, in response to data representative of system conditions. This conveys improved information regarding problems in a system.

For example, a particular system problem may be related to performance degradation in the system. Characterizing the performance degradation information associated with a particular problem can be useful as priority information. As another example, a particular system problem may be related to service violation information detailing failure of the system to comply with intended service levels, allowing prioritization of problem correction according to business metrics. Characterizing the service violation information associated with a particular problem can also be useful as problem priority information. As a further example, a particular system problem may have a relative importance in view of monetary penalties or lost income or customer goodwill, while the problem remains uncorrected, for example. Characterizing the relative importance of the system problems can be useful as problem priority information.

In order to provide the association between the problem priority information and the system problems, a correlation between data representative of system conditions and system problems may be made. Performance degradation information and service violation information, and/or alarm information may be correlated with a particular system problem, for example. The root cause of the system problem may also be identified.

Problem priority information may help the operator to understand system problems by assessing the different perspectives provided by different priority information. Optionally, the operator can also view detailed information related to a particular system problem, such as performance degradation information, or service violation information, and/or alarm information, for example, in a system problem hierarchy, revealing a hierarchy of information available to help the operator to prioritize and schedule repair or maintenance activities.

Preferably, the method involves quantification of performance degradation information and service violation information represented in the data. Correlating the performance degradation information and the service violation information identifies the problem priority information associated with each system problem. This correlated information may also be used to quantify a relative importance of the system problems to provide further problem priority information. The problem priority information for each system problem may be depicted concurrently with the system problems. Details of performance degradation information and service violation information may also be available with priority information.

The method may also involve providing signals to display a system problem hierarchy, listing the system problems, and listing the performance degradation information, alarm information and/or service violation information associated with a selected system problem. The method may further involve the display details of selected data such as alarm data, performance data and/or service violation information.

In accordance with another aspect of the invention, there is provided a method of annunciating problems in a system. The method involves displaying a plurality of system problems and problem priority information associated with the system problems in response to data representative of system conditions.

In accordance with another aspect of the invention, there is provided a computer readable medium for providing instructions for directing a processor circuit to produce signals for concurrently indicating a plurality of system problems and problem priority information associated with the system problems, in response to data representative of system conditions.

In accordance with another aspect of the invention, there is provided a signal embodied in a carrier wave, the signal comprising a code segment for directing a processor circuit to produce signals for concurrently indicating a plurality of system problems and problem priority information associated with the system problems, in response to data representative of system conditions.

In accordance with another aspect of the invention, there is provided an apparatus for annunciating problems in a system, comprising a device for receiving data representative of system conditions and a device for producing signals for concurrently indicating a plurality of system problems and problem priority information associated with the system problems, in response to the data.

Various aspects of the invention may be particularly applicable for use in annunciating problems in a telecommunications network in which the system problems and priority information are concurrently depicted, and optionally, details of alarm data, performance degradation data and service violation data correlated to the system problem may also be depicted. The network may provide performance degradation information and service violation information relating to the telecommunications network in data units. An alarm data unit may provide information regarding an alarm raised by a physical network element. A physical network element may be a network hub, a switch, or a repeater, for example. A performance degradation data unit may provide information regarding failure to meet a particular performance level based on a particular performance metric. The performance metric may be a call rate threshold or a frame loss rate, for example. A service violation data unit may provide information regarding a failure to comply with an established service level based on a particular service metric. The service metric could be mean time between failures or latency, for example. Alarm data units, performance degradation data units and service violation data units may be correlated to the system problems. One of these alarm data units and/or performance degradation data units may be designated as being the root cause of a system problem. The priority information in this embodiment may include counts of the alarm data units, performance degradation data units and service violation data units correlated to the system problem. The priority information in this embodiment may further include a relative importance value calculated from penalties associated with respective service violations.

Alternatively, embodiments of the invention may be applied to systems other than telecommunications networks, such as service organizations, for example.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIGS. 2A and 2B are is an exemplary screen shot produced by the apparatus shown in FIG. 1, showing service violation details;

FIGS. 3A and 3B are is a second exemplary screen shot produced by the apparatus shown in FIG. 1, showing alarm details;

FIG. 6 is a tabular representation of an alarm data unit received by the apparatus shown in FIG. 1;

FIG. 7 is a tabular representation of a performance degradation data unit received by the apparatus shown in FIG. 1;

FIG. 8 is an exemplary service violation data unit received by the apparatus shown in FIG. 1;

FIG. 9 is a problem record produced by the apparatus shown in FIG. 1;

DETAILED DESCRIPTION

Figure 1:
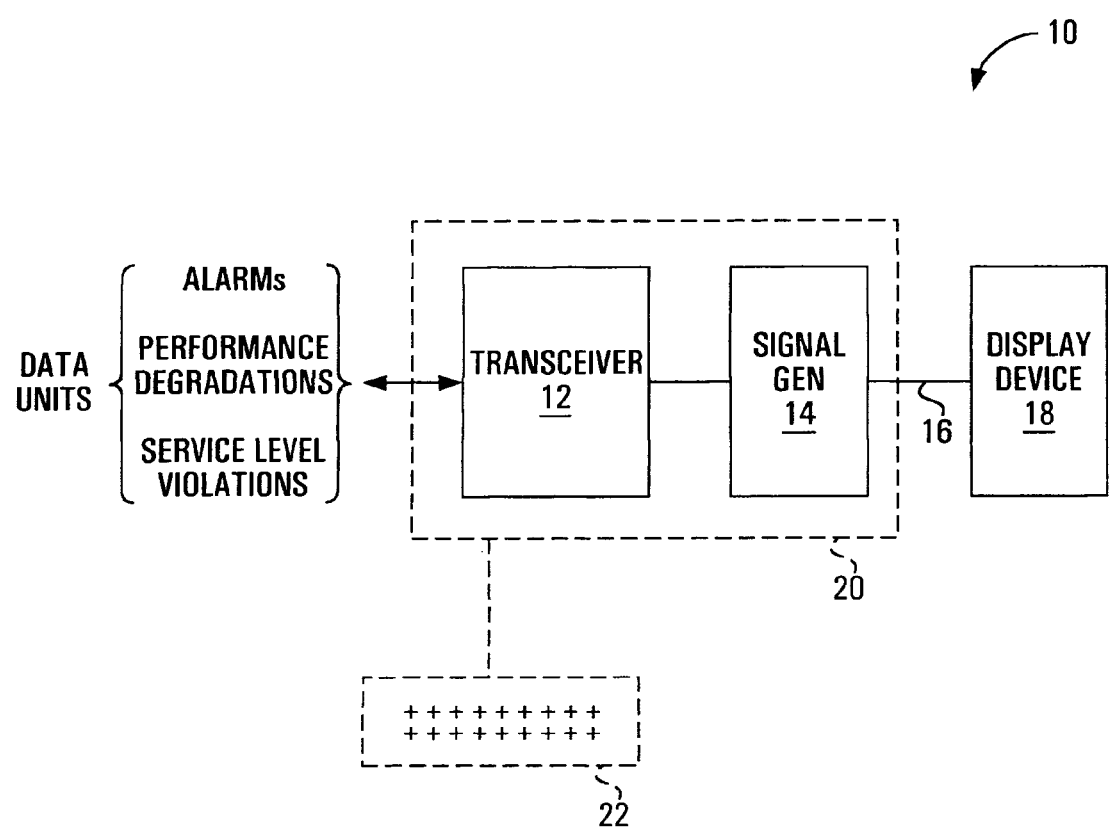
FIG. 1 is a schematic representation of an apparatus according to a first embodiment of the invention.

Referring to FIG. 1, an apparatus for annunciating problems in a system, according to a first embodiment to the invention is shown generally at 10. The apparatus includes a receiver, which in this embodiment is transceiver 12 for communicating with system monitoring equipment (not shown) to receive data representative of system conditions. The apparatus further includes a signal generator 14 for producing signals at an output shown generally at 16, for concurrently indicating a plurality of system problems and problem priority information associated with such system problems, in response to data received at the transceiver 12.

Generally conditions of a given system may be indicated by alarms, performance degradations and service level violations, for example. Typically, a service provider operating a system for providing a service will set particular limits on the operation of the service, to monitor its performance. At the same time, the service provider may have contracted with customers to provide particular levels of service. In addition, certain aspects of the performance of the system may be monitored for quantitative values, such as data throughput, for example, on a network. In the discussion that follows, the apparatus according to the first embodiment will be described in the context of a telecommunications network. In such a telecommunications network, there may be a plurality of network elements which may produce alarms such as to reflect the failure of a communications subsystem, for example. In the event of such an occurrence, a network manager device (not shown) may provide alarm data, indicative of the communications subsystem failure.

In addition, the network manager device may provide indications of performance degradations of network element equipment, such as an indication of an actual marginal call rate relative to a threshold marginal call rate, for example.

The operator of the network may have contracted with customers to guarantee certain levels of service and to accept penalties for failure to provide service at the contracted levels. Such commitments are normally set forth in a service level agreement on a customer-by-customer basis. Thus, a company such as Air Canada may have a service level agreement with the network service provider, whereby the network service provider agrees to provide a mean time between failure of five days, with a penalty of $500.00 per second, for example.

In general, data relating to alarm information, performance degradation information and service violation information is provided to the apparatus 10 by one or more components of the network. Such components may be apprised of network technology, network topology, routes and paths and may maintain a service level agreement database for each customer. Such components may variously comprise network elements, network tools, software devices or other technologies.

Based on data provided by these one or more network components, the apparatus 10 effectively produces signals for concurrently indicating a plurality of system problems and problem priority information associated with such system problems as indicated in FIGS. 2A, 2B, 3A, 3B, 4A and 4B. Referring back to FIG. 1, the signals produced at the output 16 of the apparatus 10, may drive an annunciation device, which in this embodiment is a display device shown generally at 18. The display device may be a computer monitor, for example, and the apparatus 10 itself may be encompassed within a computer 20 having a keyboard 22 for receiving user/operator input. It will be appreciated that the transceiver 12 may be located inside or outside of the computer 20 and merely serves to format the data received from the network component or components, into a format compatible with and useful for the signal generator 14.

Figure 5:
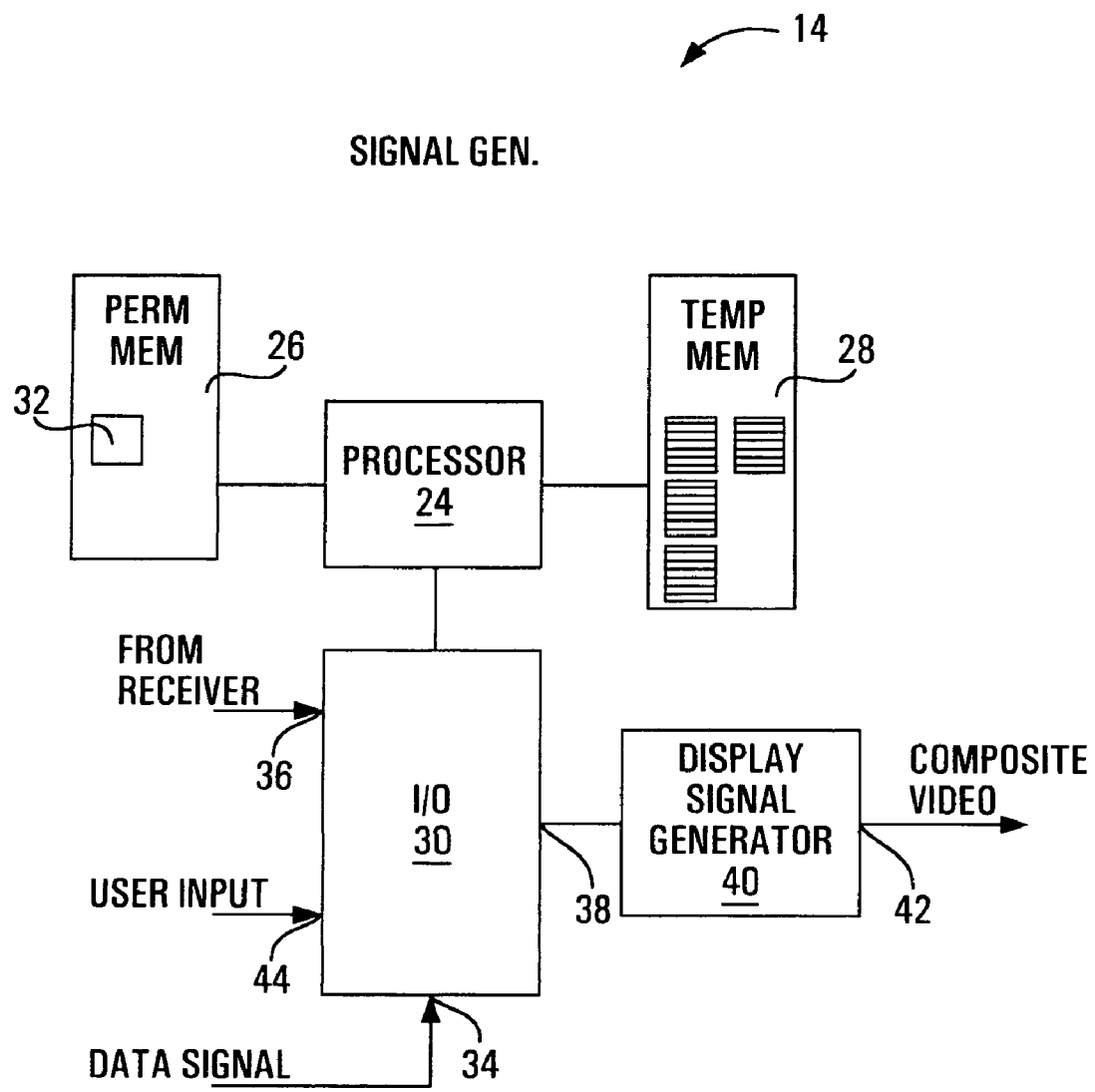
FIG. 5 is a block diagram of a signal generator of the apparatus shown in FIG. 1.

Referring to FIG. 5, an exemplary signal generator is shown generally at 14. This signal generator 14 includes a processor 24, permanent memory 26, temporary memory 28 and an I/O unit 30, all in communication with the processor 24. Effectively the permanent memory stores code segments 32 for directing the processor 24 to carry out methods according to this embodiment of the invention. In doing so, the processor may be directed to access the temporary memory 28 and to access the I/O unit 30.

Effectively, the code segments 32 may be received at an input 34 of the I/O unit 30 and subsequently stored in the permanent memory 26. The code segments may be received in a carrier wave, for example, which is demodulated to extract the code segment and apply it as a data signal to the input 34. Alternatively, the processor may have a disc drive or a tape drive (not shown) for enabling the processor to receive the code segment 32 from a computer readable medium.

The I/O unit 30 has an input 36 for receiving alarm data, performance degradation data and service level violation data, from one or more network components capable of providing such data. In response, the code segment 32 directs the processor to store the data in the temporary memory 28. Then, the code segment 32 directs the processor to examine and correlate the data and to produce signals at an output 38 of the I/O unit 30, which in this embodiment are received by a display signal generator 40 which has an output 42 for producing a composite video signal for driving the display device 18 shown in FIG. 1. Particular selections of what information is to be included within the signals produced at the output 38, and ultimately the signals included within the composite video signal produced at the output 42, are determined by the correlations determined by the processor 24 and user input received at a further input 44 of the I/O unit 30.

Referring to FIG. 6, exemplary alarm data according to the first embodiment of the invention may be provided to the transceiver 12 of FIG. 1 from network system components, in the form of a packet of data or data unit shown generally at 50. In this embodiment the alarm data unit 50 includes a data unit type field 52, a network element ID field 54, a network element name field 56, an alarm identification field 58, a time field 61 and a plurality of other fields shown generally at 60, which generally define the alarm. The alarm data further includes a root cause flag field 62 and a problem ID field 64.

In this embodiment, the alarm data unit 50 is prepared by an alarm correlator device and method described in U.S. patent application Ser. No. 09/298,832, which is owned by the assignee of the present application, and which is incorporated herein by reference. This apparatus and method provide for automatic correlation of problem identifications with network element identifications and alarm identifications. Thus, before the alarm data unit is received by the transceiver 12 the contents of the problem ID field 64 of the alarm data unit 50 are determined by the above-mentioned alarm correlator devices and method and this serves to establish at least an initial correlation between problem identification and alarm identification and network element identifications for use by the apparatus 10 according to this embodiment. In addition, the alarm correlator described above identifies an alarm indicative of the root cause of the problem identified in the problem ID field 64 and provides a true or false value in the root cause flag field 62 indicating whether or not the alarm represented by the alarm data unit is identified as the root cause of the problem identified in the problem ID field 64.

Referring to FIG. 7, exemplary performance degradation data is shown in the form of a performance degradation data unit shown generally at 70. This type of performance degradation data unit 70 is provided to the transceiver 12 by network equipment capable of monitoring at least one network performance metric. In this embodiment, the performance degradation data unit includes a data unit type field 72, a network element name field 74, a network element ID field 76, a unit field 78, a metric field 80 indicative of the metric being monitored, an actual value field 82 for holding a value representing an actual value of the metric identified by metric field 80, a threshold field 84 for identifying a threshold value of the metric, a network service field 86, a time field 88 for identifying when the measurement of the metric was taken, and a blank problem ID field 90. The problem ID field is left blank for completion by the apparatus 10 according to the present embodiment of the invention as it carries out the function of correlating as will be described below.

Referring to FIG. 8, service violation data is shown in the form of a service violation data unit shown generally at 100 and is produced by network equipment capable of monitoring service level agreement violations and providing service violation data units of the type described. The service violation data unit 100 includes a data unit type field 102, a customer field 104, a customer service field 106, a level field 108 for identifying the quality of the service, a metric field 110 for identifying a network metric which is the subject of a clause in a service level agreement, a delivered field 112 for identifying the performance achieved under the metric, an agreed field 114 for identifying the agreed performance to be provided under the metric according to the service level agreement, a penalty/impact field 116 for identifying the cost associated with failure to meet the agreed performance under the metric, a contract ID field 118 for providing an index to a contract in which the agreement as to performance under the metric is indicated, a time field 119 indicating the time of the service violation, and a plurality of network ID fields shown generally at 120 for identifying network elements which affect the ability to deliver the performance agreed under the metric, and finally a problem ID field 122 which is left blank. Again, the problem ID field 122 is completed by the apparatus 10 according to the present embodiment of the invention in performing its correlation functions.

Effectively, the alarm data unit 50 shown in FIG. 6, the performance degradation data unit 70 shown in FIG. 7, and the service violation data unit 100 shown in FIG. 8, are presented to the transceiver of the apparatus 10 shown in FIG. 1, by equipment which in this embodiment does not form part of the apparatus 10 shown in FIG. 1. Rather these data units are provided by one or more network components having the capability of monitoring network performance, to produce such data units.

Effectively, in response to receiving data such as in data units of the type shown in FIGS. 6 to 8, the apparatus shown in FIG. 1 produces problem records of the type shown at 130 in FIG. 9. Such a problem record includes a problem ID field 132, a problem description field 134, a violation count field 136, an alarm count field 138, a degradation count field 140, a cost field 142, a time field 144, a cause and correction field 146, and a document reference field 148. The contents of at least some of the above fields are represented in the signals ultimately appearing at the output 42 of the display signal generator shown in FIG. 5, to produce a problem record, an exemplary one of which is shown at 150 in FIGS. 2A, 3A and 4A where the contents of the fields shown in the problem record 130 shown in FIG. 9 are shown in a line, in association with each other. Furthermore, the contents of the fields shown in FIG. 9 represent information related to a system problem, and in this embodiment, the signals produced by the apparatus shown in FIG. 1, cause a plurality of system problems to be listed in a problem list, along with similar information relating to the system problem, arranged in a manner which provides for easy comparison of problem information by an operator viewing a display on which the problem list is presented. This information includes problem priority information shown at 152, 154, 156 and 158 in FIG. 2A, corresponding to fields 136, 138, 140 and 142 of problem record 130 shown in FIG. 9.

Figure 10:
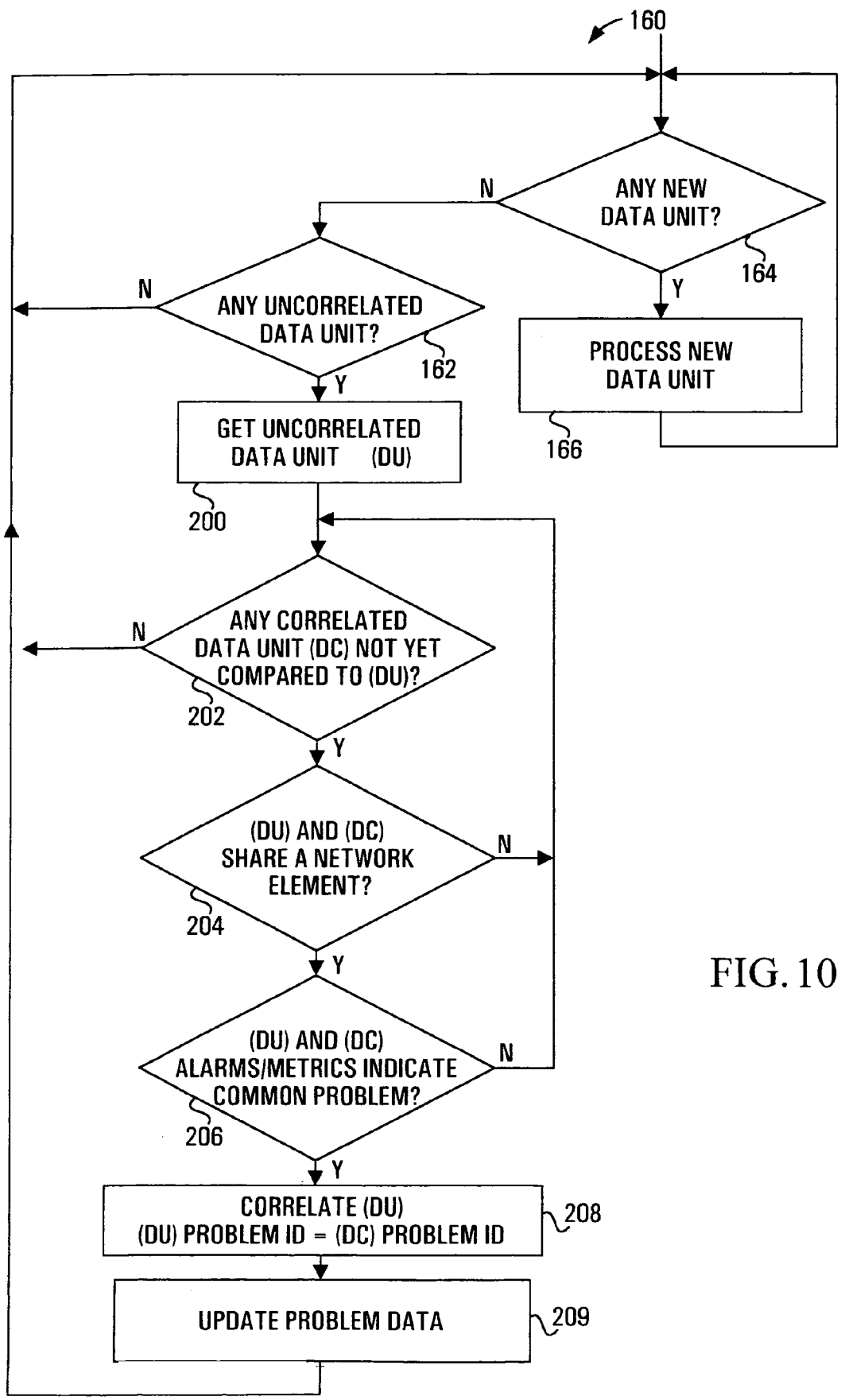
FIG. 10 is a flowchart of a process executed by a processor shown in FIG. 5, for correlating uncorrelated data units with correlated data units of the type shown in FIGS. 6, 7 and 8 and for updating problem records of the type shown in FIG. 9.

In order to produce a problem record 130, the code segment 32 shown in FIG. 5 directs the processor 24 to execute a process which is exemplified by the process shown at 160 in FIG. 10. This process begins by directing the processor 24 to search the temporary memory 28 for uncorrelated data units. This is exemplified at block 162 in FIG. 10. In order to determine whether or not a data unit is correlated or uncorrelated, the appropriate problem ID field 64 in FIG. 6, 90 in FIG. 7 and 122 in FIG. 8, is read to determine whether or not the contents bear a valid problem identification code. Initially, therefore, if service violation data units 100 are received or performance degradation data units 70 are received without first having received at least one alarm data unit 50, such service violation data units 100 and performance degradation data units 70 will not yet be correlated.

When an alarm data unit 50, shown in FIG. 6, is received, an initial correlation is provided between a problem ID as indicated in the problem ID field 64 thereof and a network element ID as indicated in the network element ID field 54 thereof. Then, any existing or subsequently received service violation data units 100 and/or performance degradation data units 70 may be correlated with an already received alarm data unit 50. Thus, if at block 164 there are new received data units, block 164 directs the processor to proceed to block 166. When a new data unit is received, block 166 directs the processor to process the new data unit according to the process shown at 166 in FIG. 11.

Figure 11:
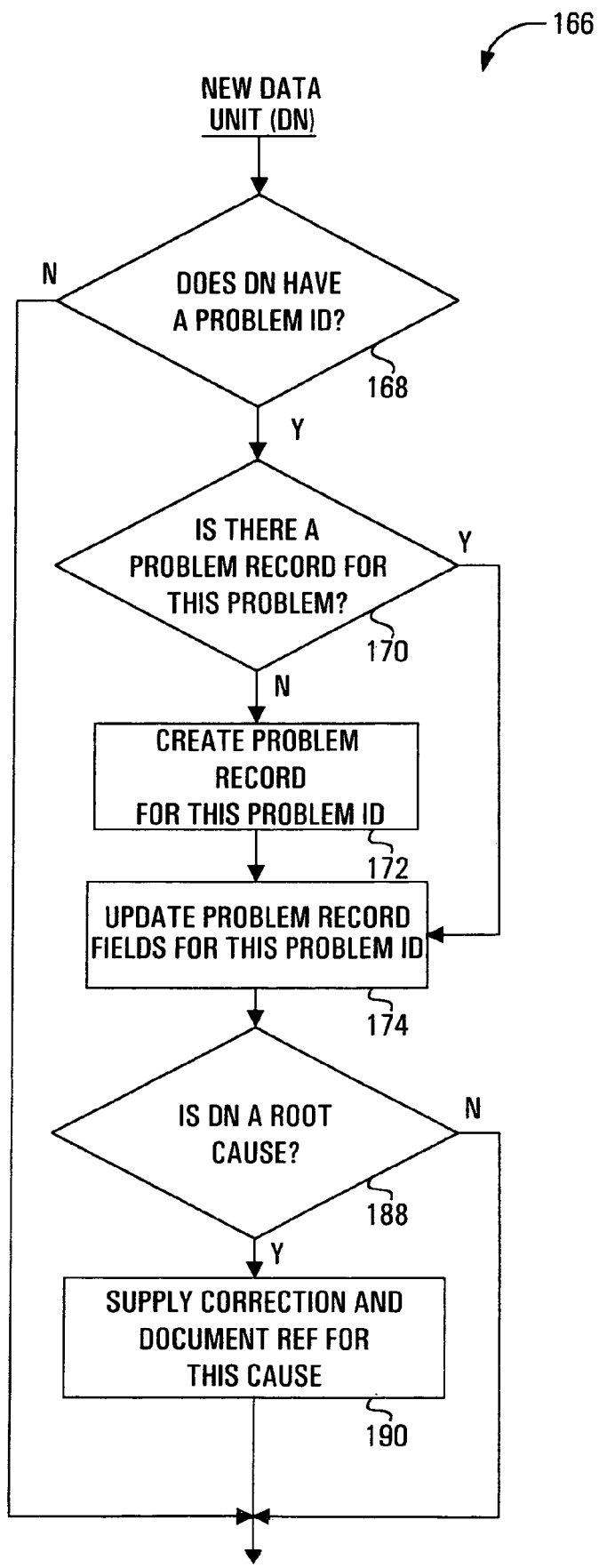
FIG. 11 is a flowchart of a sub-process initiated in the process shown in FIG. 10, for associating and maintaining a problem record of the type shown in FIG. 9 with a data unit of the type shown in FIGS. 6, 7 and 8.

The process shown in FIG. 11 begins with block 168 which directs the processor to determine whether or not the received data unit has a problem ID in the problem ID field 64, 90 or 122 in FIGS. 6, 7 and 8, respectively. If so, then block 170 directs the processor 24 to determine whether or not there is a problem record 130 having a problem ID field 132 with the same problem ID. If not, then block 172 directs the processor 24 to create a problem data record for this problem ID. In this regard, a blank problem record is produced. If at block 170 there is an existing problem record for the identified problem, or if a new problem record has been created, block 174 directs the processor 24 to update the problem record fields for the identified problem. To do this, the processor 24 is directed to the process shown at 176 in FIG. 12.

Figure 12:
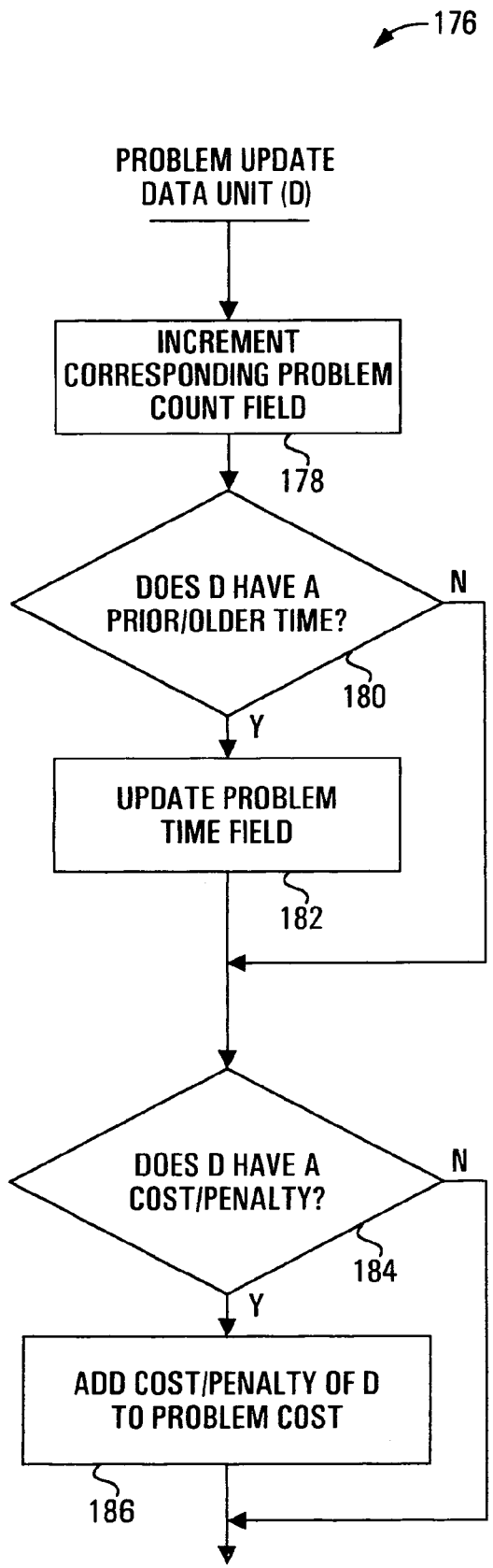
FIG. 12 is a flowchart of a sub-process initiated by the process shown in FIG. 10 for updating a problem record of the type shown in FIG. 9.

Referring to FIG. 12, block 178 directs the processor 24 to increment the corresponding violation count field 136, alarm count field 138 or degradation count field 140, depending on the data unit type of the new data unit. Block

180 then directs the processor 24 to compare the problem record time field 144 to determine whether or not there is a prior/older time in the new data unit and, if so, then block 182 directs the processor 24 to update the problem time field 144 shown in FIG. 9 with the time in the time field 61, 88 or 119 of the new associated data unit 50, 70 or 100. Then, block 184 directs the processor 24 to determine whether or not there is a penalty associated with the problem as indicated if the new data unit is a service violation data unit 100, and if so, block 186 directs the processor 24 to add the cost indicated in the penalty impact field 116 of the service violation data unit 100 shown in FIG. 8, to the cost field 142 of the associated problem record 130 shown in FIG. 9.

It will be appreciated by one of ordinary skill in the art that there are alternative ways to calculate a problem cost for the problem cost field 142. Such alternatives could involve identifying particularly important customers, related to the data units, identifying particularly important network elements, or accessing additional data relating to problem cost, for example.

After completing block 174, the processor 24 is then directed back to block 188 of FIG. 11, which causes it to read the contents of the root cause flag field 62 if the new data unit is an alarm data unit 50 shown in FIG. 6, to determine whether or not the contents of the root cause flag field 62 indicates that the alarm data unit 50 shown in FIG. 6 is associated with a root cause of the problem. If so, then block 190 directs the processor 24 to look in a lookup table (not shown) to locate and produce signals to display corrective information and an associated document reference, for the indicated root cause.

If the root cause flag 62 is found not to be set, such that the alarm data unit is not associated with the root cause of the problem, or if corrective action and a document reference for an indicated root cause have been provided, the process shown in FIG. 11 is completed and the processor 24 is returned to block 162 in FIG. 10. Thus, the processes carried out by blocks 162 through 166 and the processes shown in FIGS. 11 and 12, serve to create or update problem records in response to correlated data units received by the apparatus 10.

If at block 162, an uncorrelated data unit is found in the temporary memory 28, block 200 directs the processor 24 to get the uncorrelated data unit from memory. Then, block 202 directs the processor 24 to determine whether or not any correlated data unit (that is one having a completed problem ID field 64, 90 or 122 in FIG. 6, 7 or 8, respectively), has not yet been compared to the data unit obtained at block 200. If all correlated data units have been compared to the presently obtained data unit, then the processor 24 is directed back to block 160. If any correlated data unit has not yet been compared to the present data unit, then block 204 directs the processor 24 to determine whether or not the present data unit is associated with the same network element of another data unit with which a problem ID has been associated. If not, then the processor 24 is directed back to block 202 to compare the present data unit with any other correlated data unit with which it has not yet been compared. If at block 204, the present data unit and the data unit to which it is being compared share a network element, then block 206 directs the processor 24 to use a lookup table to determine whether alarms and metrics indicate a common problem.

Each data unit has either a type of metric or type of alarm indicated at 58 in FIG. 6, at 80 in FIG. 7, or at 110 in FIG. 8. The lookup table (not shown) indicates whether different types of alarm and types of metric are symptomatic of a common problem. The lookup table contains one such indication for each possible pairwise combination of alarm and metric types. Thus, by looking up the type of alarm or metric 58, 80, or 110, from both the present data unit and the existing correlated data unit to which it is being compared, the lookup table indicates whether these data units relate to a common problem. If they do not relate to a common problem, then the processor 24 is directed back to block 202. If they relate to a common problem, the processor 24 is directed to block 208 which causes it to correlate the present data unit with the existing correlated data unit. This is done by storing the contents of the problem ID field of the existing correlated data unit in the problem ID field of the present uncorrelated data unit (thereby making it correlated). Then, at block 209, the process shown at 176 in FIG. 12 is run to update the problem record 130 shown in FIG. 9 and the processor 24 is directed back to block 164 in FIG. 10. In the above manner, problem records are continually updated as new data units and previously uncorrelated units are correlated with existing correlated data units.

It will be appreciated by one of ordinary skill in the art upon review of this specification that there are alternative ways to correlate data units. The particular data fields to be compared and the manner of comparison will depend on the application domain and desired result.

Referring to FIGS. 2A, 2B, 3A, 3B, 4A and 4B, the processor 24 shown in FIG. 5, is programmed to receive user input such as may be provided by the keyboard 22 shown in FIG. 1, to permit a user to select problems from among the problem list, for which more detail is desired. More detail is provided in the form of a detail list, which in this embodiment includes details of service violations as shown at 210 in FIG. 2B, alarms such as shown at 212 in FIG. 3B, and performance degradations such as shown at 214 in FIG. 4B.

Referring to FIG. 2B in this embodiment, service violations are displayed on respective rows and the data seen on each respective row is obtained from corresponding fields of the associated service violation data unit 100 shown in FIG. 8. The appropriate service violation data unit is determined by the contents of the problem ID field 122, which is specified by the problem selected by the user from the problem list. Thus, using the problem ID associated with the user selected problem from the problem list, service violation data associated with the identified problem may be listed and displayed.

Similarly, alarm information for each alarm is shown on a respective line or row in the display shown at 212 in FIG. 3B. Similarly, performance degradation information is shown on respective rows of the display 214 shown in FIG. 4B

Referring to FIGS. 2A, 2B, 3A, 3B, 4A and 4B it will be appreciated that once a user selects a problem from the problem list, the user may then select one of three tabs 216, 218 and 220, to cause details of service violations, alarms, and performance degradations respectively to be displayed.

In addition, the display produced by the apparatus may include a further information area shown generally at 222 for providing further information pertinent to resolution of the problem. Such additional information may be provided by accessing one or more lookup tables using the contents of any of the fields in any row of the displayed detail list. Thus, for example, notes about the contracted level of service for a selected customer, and customer contact information, may be provided in the further information area 222. In addition, a view contract button 224 may be provided on the display to provide an immediate link to the actual service contract with the indicated customer, which in this example is "Joe's Garage". Similarly, as shown in FIG. 3B information about the location of a selected alarm may be provided in the further information area 222.

Figure 2A:
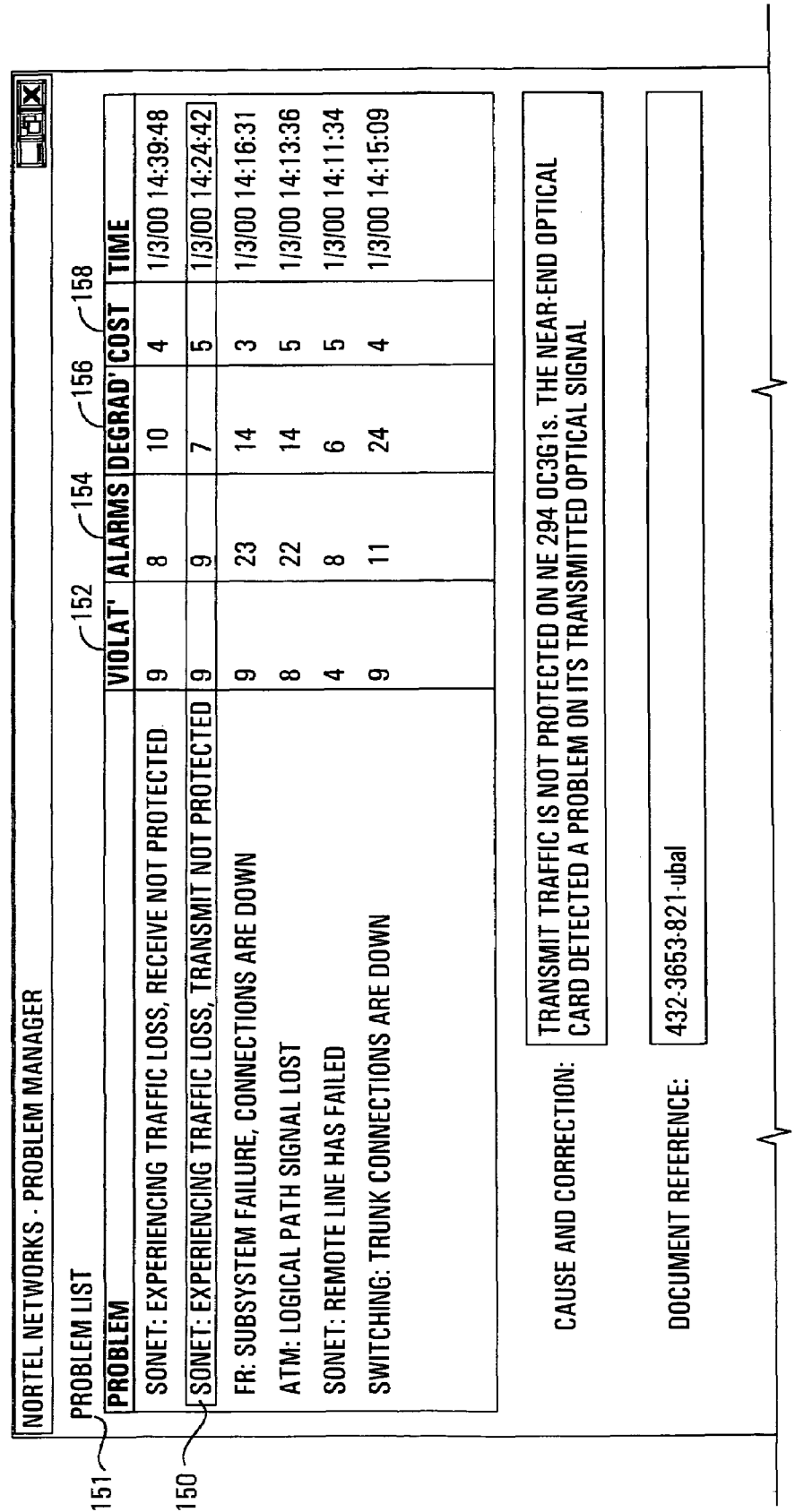
Figure 4A:
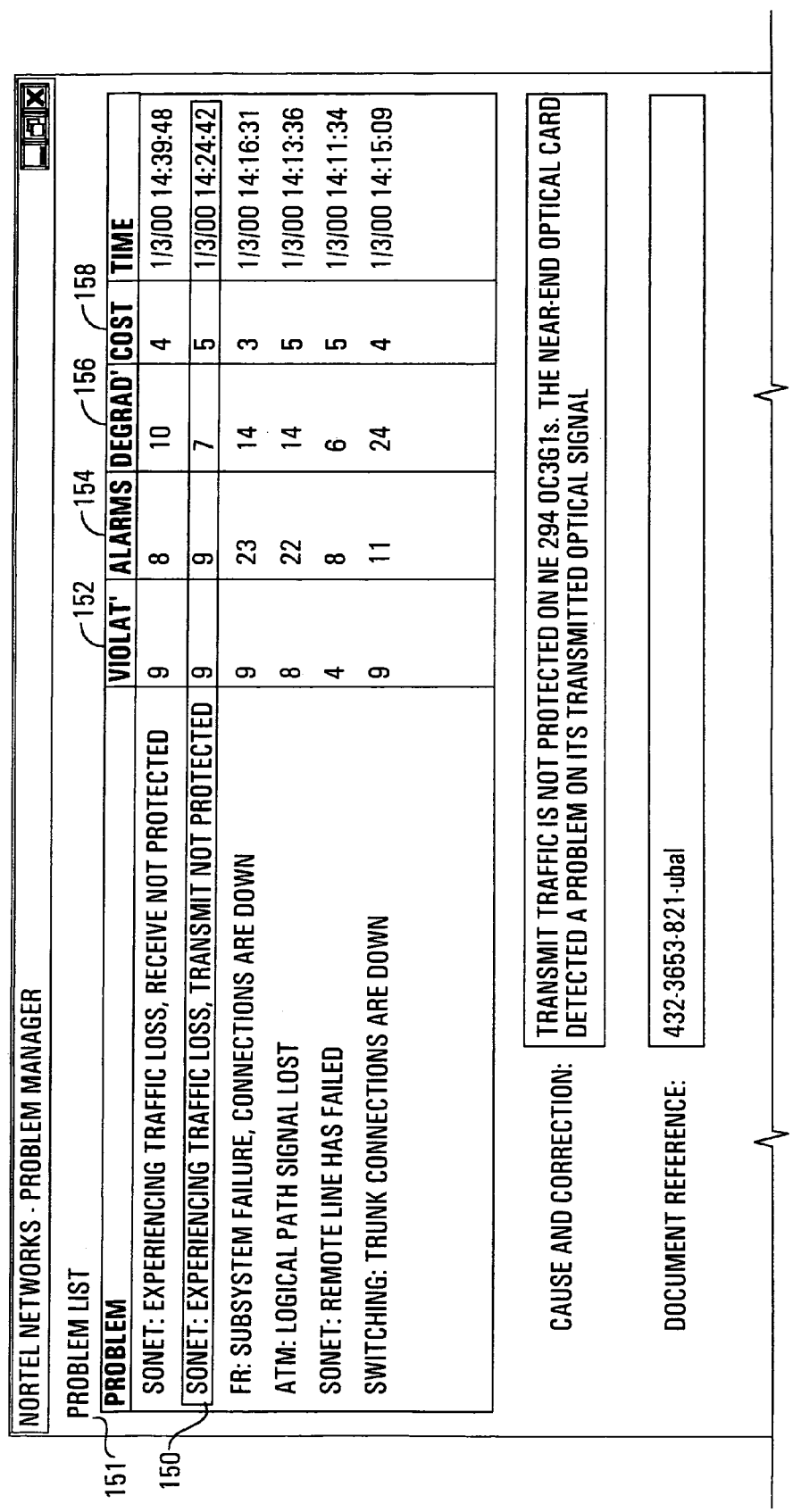
FIGS. 4A and 4B are is a third exemplary screen shot produced by the apparatus shown in FIG. 1, showing performance degradation details.
Figure 4B:
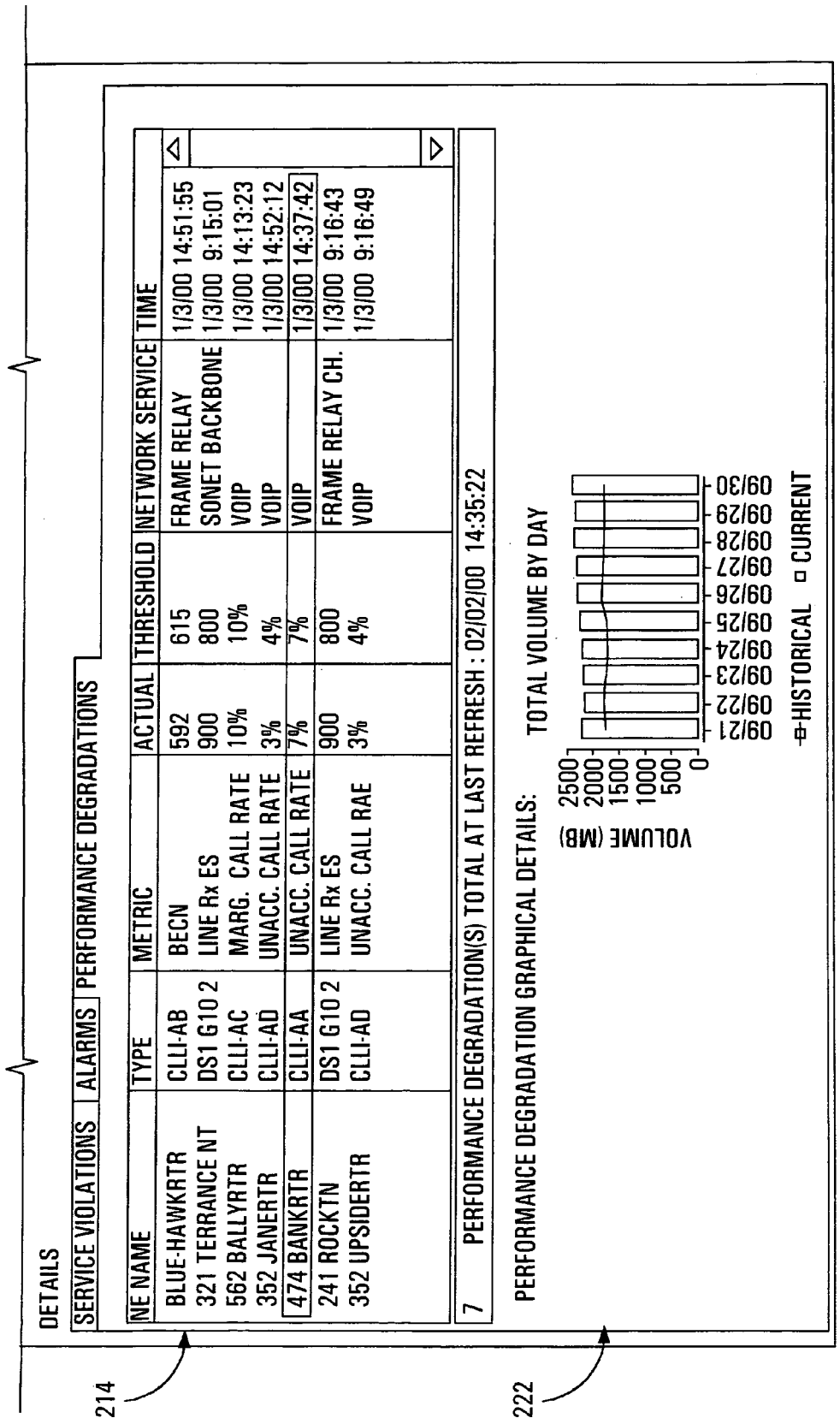

Similarly, referring to FIG. 4B trend information, for example, may be shown in the further information area, to indicate trends of a particular metric on a particular piece of equipment such as "474 Bank RTR" may be displayed. Rather than providing such trend information in a lookup table, the processor 24 may be programmed to access a server for such information in response to user selection of a particular row in area 214. In the above manner, a system problem hierarchy is shown whereby a problem list listing problems with the system providing the service to customers, shown at 151 in FIGS. 2A, 3A and 4A, is provided at the top of the display and sub-components of a selected problem are selectively displayed in a middle portion of the display, as shown at 210, 212 and 214, and further information relating to user selected details listed in the middle portion of the display a own in a lower portion of the display, as shown at 222 in FIGS. 2B, 3B and 4B thus completing and facilitating the display of problem hierarchy.

Thus, the apparatus and methods described herein provide for identifying and prioritizing problems in a system in order to determine appropriate strategies or scheduling for maintenance or repair. Systems may exhibit many symptoms and effects related to problems that can be much more easily assessed with the help of the apparatus and methods described herein to organize and present appropriate information in a comprehensive manner.

While specific embodiments of the invention have been described and illustrated, such embodiments should be considered illustrative of the invention only and not as limiting the invention as construed in accordance with the accompanying claims.

What is claimed is:

1. A method of annunciating problems in a system, comprising
    receiving information from network components, said information representative of system conditions, and including alarm information associated with system fault events, performance degradation information, and service violation information,
    correlating alarm information with performance degradation information and service violation information to provide identification of system problems, and to quantify said alarm information, performance degradation information and service violation information associated with said identified system problems, to produce problem priority information for said identified system problems; and
    producing signals for concurrently annunciating said system problems and said problem priority information associated with said system problems and for annunciating at least one of alarm information, performance degradation information and service violation information associated with said system problems.

2. The method of claim 1 wherein producing problem priority information comprises quantifying a relative importance of said system problems.

3. The method of claim 2 further comprising determining a cost associated with at least one problem.

4. The method of claim 3 wherein determining the cost, comprises determining service level agreement penalties associated with breaches of service level agreement clauses.

5. The method of claim 1 further comprising determining performance degradation information and service violation information associated with a root cause of one of said plurality of system problems.

6. The method of claim 5 further comprising receiving alarm information, from an alarm correlator, comprising an indication of an alarm associated with a root cause of a system problem.

7. The method claimed in claim 1 wherein concurrently annunciating comprises concurrently annunciating for use by a display device for producing a display image.

8. The method of claim 7 further comprising enabling user selection of at least one of performance degradation information, alarm information and service violation information, for concurrent display with an associated system problem.

9. The method of claim 1 wherein receiving said alarm information comprises receiving a plurality of alarm data units.

10. The method of claim 1 wherein receiving said performance degradation information comprises receiving a plurality of performance degradation data units.

11. The method of claim 1 wherein receiving said service violation information comprises receiving a plurality of service violation data units.

12. The method of claim 1 wherein the step of receiving information representative of system conditions, including alarm information associated with system fault events, performance degradation information, and service violation information comprises receiving alarm data units for providing alarm information, receiving performance degradation data units for providing performance degradation information and receiving service violation data units for providing service violation information.

13. The method of claim 12 further comprising associating at least one of said performance degradation information and said service violation information with one of said identified system problems.

14. The method of claim 13 further comprising producing signals representing a count of at least one of said alarm data units, said performance degradation data units and said service violation data units associated with identified system problems.

15. The method of claim 1 wherein concurrently annunciating comprises concurrently annunciating to display a system problem hierarchy including at least one system problem, and at least one of performance degradation information, alarm information and service violation information associated with a selected one of said problem objects.

16. The method of claim 1 further comprising transmitting said concurrently annunciated system problems and problem priority information as signals to a display device for use in producing a visual display.

17. The method of claim 16 further comprising producing a display image in response to said signals.

18. A method of annunciating problems in a system comprising:
    receiving information from network components, said information representative of system conditions, and including alarm information associated with system fault events, performance degradation information, and service violation information;
    correlating alarm information with performance degradation information and service violation information, to identification of system problems, quantifying said alarm information, performance degradation information and service violation information associated with said identified system problems to produce problem priority information for said system problems; and concurrently visually annunciating said system problems and said problem priority information associated with said system problems.

19. A computer readable medium encoded with instructions for directing a processor circuit to carry out the method of claim 1.

20. An apparatus for annunciating problems in a system, comprising
  a) means for receiving data representative of system conditions, said data including, including alarm information associated with system fault events, performance degradation information, and service violation information associated with system problems;
  b) means for correlating said alarm information with performance degradation information and said service violation information to provide identification of system problems and produce problem priority information for said identified system problems; and
  c) means for concurrently annunciating said system problems and said problem priority information associated with said system problems.

21. An apparatus for annunciating problems in a system, comprising:
  a) a receiver for receiving data representative of system conditions, said data including alarm information associated with system fault events, performance degradation information and service violation information associated with system problems;
  b) a signal generator including a processor in communication with said receiver for correlating said alarm information with performance degradation information and said service violation information, to identify system problems and quantifying said alarm information, performance degradation information and service violation information to produce problem priority information for said identified system problems and to concurrently annunciate said system problems and said problem priority information associated with said system problems.

22. The apparatus of claim 21 wherein said processor circuit is configured to quantify a relative importance of said system problems.

23. The apparatus of claim 22 wherein said processor circuit is configured to associate a cost with at least one system problem.

24. The apparatus of claim 23 wherein said processor circuit is configured to produce signals representing service level agreement penalties which are associated with breaches of service level agreement clauses.

25. The apparatus of claim 21 wherein said signal processor circuit is configured to concurrently annunciate said performance degradation information and said service violation information as being associated with a root cause of one of said plurality of system problems.

26. The apparatus of claim 25 wherein said receiver is configured to receive alarm information from an alarm correlator comprising an indication of an alarm associated with a root cause of a problem.

27. The apparatus claimed in claim 21 wherein said signal generator is operable to produce signals for use by a display device for producing a display image.

28. The apparatus of claim 27 wherein said signal generator is operable to produce signals for concurrently displaying with an associated system problem at least one of performance degradation information, alarm information and service violation information.

29. The apparatus of claim 28 wherein said signal generator is operable to produce said signals for concurrently displaying said at least one of performance degradation information, alarm information and service violation information in response to user input.

30. The apparatus of claim 28 wherein said receiver is configured to receive alarm information comprising a plurality of alarm data units.

31. The apparatus of claim 28 wherein said receiver is configured to receive performance degradation information comprising a plurality of performance degradation data units for providing said performance degradation information.

32. The apparatus of claim 28 wherein said receiver is configured to receive service violation information comprising a plurality of service violation data units for providing service violation information.

33. The apparatus of claim 28 wherein said receiver is configured to receive alarm data units for providing alarm information, receive performance degradation data units for providing performance degradation information and receive service violation data units for providing service violation information.

34. The apparatus of claim 33 wherein said signal generator is configured to correlate at least one of said alarm data units, performance degradation data units and service violation units to identify system problems and associate said data units with said system problem.

35. The apparatus of claim 34 wherein said signal generator is configured to produce a count of at least one of said alarm data units, said performance degradation data units and said service violation data units related to said one of said system problems.

36. The apparatus of claim 21 wherein said signal generator is configured to produce signals for depicting at least one of performance degradation information and service violation information.

37. The apparatus of claim 36 wherein said receiver is configured to receive data representing system fault events.

38. The apparatus of claim 21 wherein said signal generator is configured to cause said signals to indicate a system problem hierarchy including at least one system problem, and a representation of at least one of performance degradation information, alarm information and service violation information associated with one of said system problems, selected by a user.

39. The apparatus of claim 21 further comprising a transmitter for transmitting said signals to a display device.

40. A display apparatus for annunciating problems in a system, the apparatus comprising:
  a) a receiver for receiving data representative of system conditions, said data including alarm information, performance degradation information and service violation information;
  b) a signal generator including a processor circuit in communication with said receiver to correlate said alarm information, performance degradation information and said service violation information, to identify system problems, to quantify alarm information, performance degradation information and service violation associated with said system problems to produce problem priority information for said system problems; and to concurrently annunciate said system problems and said problem priority information associated with said system problems; and c) a display device for producing a visual image displaying said concurrently annunciated system problems and problem priority information.

41. A method of annunciating problems in a system, comprising correlating alarm information, performance degradation information and service violation information to identify system problems, quantifying alarm information, performance degradation information and service violation associated with said system problems to produce problem priority information correlated to said system problems; and concurrently annunciating said system problems and said problem priority information associated with said system problems visually.

42. A method of annunciating problems in a system, comprising correlating alarm information, performance degradation information and service violation information to identify system problems, and quantifying said alarm information, performance degradation information and service violation to produce problem priority information correlated to said system problems; and concurrently visually annunciating said system problems and said problem priority information associated with said system problems, and producing signals which represent a cost associated with at least one problem.

43. An apparatus for annunciating problems in a system, comprising:
   a) a receiver for receiving current data representative of system conditions, said current data including alarm information associated with system fault events, current performance degradation information and service violation information associated with system problems; and
   b) a signal generator including a processor circuit in communication with said receiver to correlate said alarm information, performance degradation information and said service violation information, to identify system problems and to quantify alarm information, performance degradation information, and service violation information to produce problem priority information correlated to said system problems; and to concurrently annunciate said system problems and said problem priority information correlated with said system problems.

44. An apparatus for annunciating problems in a system, comprising:
   a) a receiver for receiving current data representative of system conditions, said current data including alarm information associated with system fault events, performance degradation information and service violation information; and
   b) a signal generator including a processor circuit in communication with said receiver to correlate said alarm information, performance degradation information and said service violation information, to identify system problems, and to quantify said data representative of system conditions to produce problem priority information correlated to said system problems; and to concurrently annunciate said system problems and said problem priority information correlated to said system problems, and wherein said signal generator comprises means for associating a cost with at least one system problem.

* * * * *